UNITED STATES PATENT OFFICE.

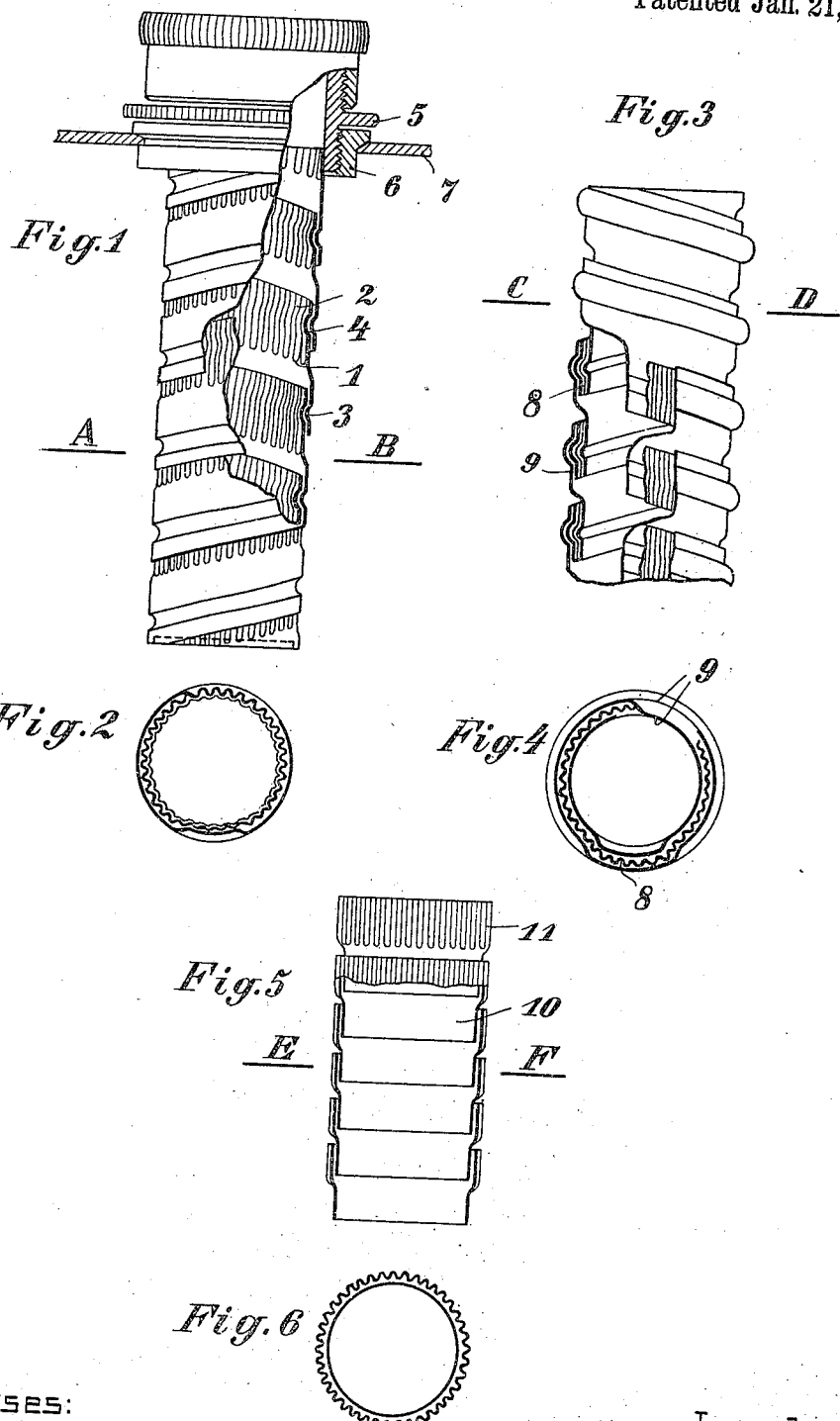

KARL LANGREHR, OF DÜSTRUP, NEAR OSNABRÜCK, GERMANY.

SAFETY FILLING AND EMPTYING DEVICE.

1,051,128.

Specification of Letters Patent. Patented Jan. 21, 1913.

Application filed December 22, 1909. Serial No. 534,492.

*To all whom it may concern:*

Be it known that I, KARL LANGREHR, subject of the King of Prussia, residing at Düstrup, near Osnabrück, Germany, have invented new and useful Improvements in Safety Filling and Emptying Devices, of which the following is a specification.

The object of the invention is to provide a device of this character insuring a very high degree of safety.

The device may be formed of a series of corrugated strips and smooth strips, or of a strip partly corrugated and partly smooth, assembled or coiled so as to form a comparatively rigid tubular structure with the smooth parts against the corrugated parts, so that restricted passages are formed between inner and outer walls communicating with the inside and outside of the tube at a plurality of levels or points along the length of the tube. The passages are shorter than the length of the tube and have long, solid, unperforated, flame cooling walls so that the passage is many times longer than its width.

The invention may be embodied in numerous forms.

It is desirable in carrying out the invention to choose metal of suitable strength and elasticity to insure a tight fit between the walls and to prevent relative shifting thereof.

In the accompanying drawings examples are shown of the invention.

Figure 1 shows the invention consisting of a single spiral of metal rolled or entwined upon itself and being partly smooth and partly corrugated. Fig. 2 is an end view of same. Figs. 3 and 4 are longitudinal and cross sectional views of a form in which two pieces of metal strips are used and Figs. 5 and 6 show the apparatus formed of rings adapted to fit one within the other.

In Fig. 1 the metal strip 1 has a crimped or corrugated upper edge 2 and smooth lower edge the upper edge having a groove 4 and the lower edge a groove 3. This strip is so twisted that the groove 3 on the smooth part fits into the groove 4 on the crimped part thereby preventing the displacement of the winding. These grooved portions which fit into each other, thus provide a means for stiffening and preventing displacement of the walls of the tube. The strip 1 is secured to the connecting piece 5 which is shown screwed into a ring 6 of the vessel 7. The lower end of the tube formed by the spiral is closed.

In Figs. 3 and 4 a narrow strip of corrugated metal 8 is adapted to be used with a broader smooth strip 9 which has in it two grooves one larger than the other, the smaller being adapted to fit into the larger and to hold the corrugated strip between them, the said corrugated strip being also grooved for the purpose. In this form a passage is provided on both sides of the strip 8 and thus a double length of passage is furnished as compared with the form shown in Fig. 1.

In Figs. 5 and 6 the rings are half crimped or corrugated and half smooth, the smooth part 10 of one ring being adapted to fit into the corrugated part 11 of the adjoining ring.

Having now particularly described and ascertained the nature of my said invention and in what manner the same is to be performed I declare that what I claim is:

1. A safety filling and emptying device comprising a tubular body having walls formed of alternately disposed inner and outer smooth and corrugated sheet metal portions arranged against each other so as to afford restricted passages between the inside and the outside of the tube.

2. A safety filling and emptying device to prevent explosion comprising a tubular body composed of corrugated and smooth portions arranged against each other, the corrugated and smooth portions having grooved parts which engage each other.

3. A safety tube to prevent explosions having two or more walls one within another, said walls containing between them a plurality of separate restricted passages having long unperforated flame cooling walls, said passages being shorter than the length of the tube of narrow and substantially uniform cross section throughout their length and communicating with the inside and the outside of the tube at various points intermediate its ends.

4. A safety tube to prevent explosions having two or more solid, unperforated walls, one within another, and spaced apart so as to provide a plurality of separate restricted passages, shorter than the length of the tube, between the walls, communicating with the inside and the outside of the tube at various points intermediate its ends and means for stiffening and preventing displacement of the walls of the tube.

5. A safety tube to prevent explosions having two or more solid, unperforated walls, one within another, and spaced apart so as to form a plurality of restricted passages between the walls, communicating with the inside and the outside of the tube at various points intermediate the ends of the tube.

6. A safety tube to prevent explosions having two or more walls one within another, said walls containing between them a plurality of separate restricted passages, having elongated flame cooling walls with bent portions, said passages being of narrow and substantially uniform cross section throughout their length and communicating with the inside and the outside of the tube at various points intermediate the ends of the tube.

7. A safety tube to prevent explosions, having two or more walls one within and adjacent to the other, one of the walls being corrugated so as to afford a plurality of passages shorter than the length of the tube between the corrugated wall and adjacent wall, said passages communicating with the inside and the outside of the tube at various points intermediate the ends of the tube.

8. A safety tube to prevent explosions, having two or more walls one within another, said walls having smooth and corrugated portions placed against each other so as to afford a plurality of passages for liquid and to prevent the passage of flame, said passages communicating with the inside and the outside of the tube at various points intermediate the ends of the tube.

9. A safety tube to prevent explosions, having two or more walls one within another, one of said walls having corrugated portions, said corrugated portions being next to the other wall so as to provide a plurality of passages for liquid between the walls, at various points intermediate the ends of the tube, said passages communicating between the inside and the outside of the tube.

10. A safety tube to prevent explosions, having two or more walls one within another, said walls having corrugated portions and smooth portions against the corrugated portions, whereby a plurality of passages for liquid and to prevent the passage of flame are formed between the walls constituting communications between the inside and outside of the tube.

11. A safety device to prevent explosions, comprising a tubular body, having overlapping inner and outer walls including a strip wound spirally along the tube, said walls being spaced apart so as to provide a plurality of passages between the walls at various regions intermediate the ends of the tube for the flow of liquid and to prevent the passage of flame between the inside and outside of the tube.

12. A safety device to prevent explosions, comprising a tubular body having overlapping inner and outer walls including a strip wound spirally along the tube, said walls being spaced apart and forming a plurality of passages between the walls at various regions intermediate the ends of the tube for the flow of liquid and to prevent the passage of flame between the inside and the outside of the tube, and means for stiffening and preventing displacement of the walls of the tube.

13. A safety device to prevent explosions, comprising a tubular body having overlapping inner and outer walls including a strip wound spirally along the tube, said walls having corrugated portions which afford a plurality of passages between the walls at various regions intermediate the ends of the tube for the flow of liquid and to prevent the passage of flame between the inside and outside of the tube.

14. A safety device to prevent explosions, comprising a tubular body having overlapping inner and outer walls including a strip wound spirally along the tube, said walls having corrugated portions and smooth portions against the corrugated portions, whereby a plurality of passages are afforded for liquid and to prevent the passage of flame between the walls said passages communicating between the inside and the outside of the tube.

15. A safety device to prevent explosions, comprising a tubular body formed of a single strip of material wound to form overlapping walls spaced apart so as to afford a plurality of passages for liquid and to prevent the passage of flame, thereby establishing communication between the inside and the outside of the tube.

16. A safety device to prevent explosions, comprising a tubular body made of material in strip form wound spirally lengthwise of the tube so as to afford overlapping walls, and means whereby a plurality of restricted passages for liquid and to prevent the passage of flame are formed between the overlapping portions of the walls thereby establishing communication between the inside and outside of the tube.

17. A safety device to prevent explosions, comprising a tubular body made of material in strip form wound spirally lengthwise of the tube so as to afford overlapping walls, said material being corrugated so that the corrugations provide a plurality of restricted passages for liquid and to prevent the passage of flame between the overlapping portions of the walls thereby establishing communication between the inside and outside of the tube.

18. A safety device to prevent explosions, comprising a tubular body made of material in strip form partly corrugated and partly smooth wound spirally lengthwise of the tube so that the corrugated and smooth portions overlap each other and provide a plurality of passages for liquid and to prevent the passage of flame, thereby establishing communication between the inside and outside of the tube.

19. A safety device to prevent explosions, comprising a tubular body made of a single strip of material partly corrugated and partly smooth wound spirally lengthwise of the tube so that the corrugated and smooth portions overlap each other and provide a plurality of passages for liquid and to prevent the passage of flame, thereby establishing communication between the inside and outside of the tube.

20. A safety device to prevent explosions, comprising a tubular body made of material in strip form provided with longitudinal grooves, said material being wound spirally lengthwise of the tube so as to afford a plurality of walls one within another held in place by said grooves, and means whereby a plurality of restricted passages for liquid and to prevent the passage of flame are provided between the walls, thereby establishing communication between the inside and outside of the tube.

21. A safety device to prevent explosions, comprising a tubular body having two or more walls one within another provided with engaging grooves holding the walls together, and means whereby a plurality of restricted passages for liquid and to prevent the passage of flame are formed between said walls, thereby establishing communication between the inside and outside of the tube at various regions intermediate the ends thereof.

22. A safety device to prevent explosions, comprising a tubular body having two or more walls one within another spaced apart so as to provide a plurality of restricted passages for liquid and to prevent the passage of flame, thereby establishing communication between the inside and outside of the tube at various regions intermediate the ends thereof, the walls being provided with engaging means for holding them in place.

23. A safety device to prevent explosions, comprising a tubular body formed of portions which fit into each other, and means providing a plurality of restricted passages for liquid and to prevent the passage of flame between the interfitting portions and for establishing communication between the having two or more flame cooling walls shorter than the length of the tube having portions, which are separated and arranged one within the other and next to each other so as to provide a plurality of short restricted passages between them, said passages having the inlet and outlet of each spaced apart, the inlet being at a different level from the outlet and compelling the fluid to pass in small, separate streams between the flame cooling walls lengthwise of the tube.

25. A safety device to prevent explosions, having a plurality of surfaces formed of alternately disposed smooth and corrugated sheet metal portions arranged against each other so as to afford restricted passages between the inside and the outside of the device.

26. A safety tube to prevent explosions, having a plurality of surfaces one separated from the other, said surfaces forming the walls of a plurality of restricted passages which walls and passages are shorter than the length of the tube, said passages communicating with the inside and the outside of the tube at various points intermediate its ends.

27. A safety tube to prevent explosions, having a plurality of flame cooling surfaces spaced apart, one of the surfaces being corrugated so as to afford a plurality of restricted passages between the surfaces, said passages being shorter than the length of the tube and communicating with the inside and the outside of the tube at various points intermediate its ends.

28. A safety device to prevent explosions, having a plurality of surfaces next to each other, one of the surfaces having a plurality of corrugations arranged side by side, so as to afford a plurality of restricted passages between the surfaces, said passages communicating with the inside and outside of the device.

29. A safety filling and emptying device to prevent explosions comprising a tubular body having walls composed of corrugated and smooth portions arranged against each other to form passages for the liquid and means for stiffening and preventing displacement of the walls of the tube.

30. A safety device to prevent explosions, comprising a tubular body, formed of a single strip of material, wound to form overlapping walls spaced apart so as to afford a plurality of passages for liquid and to prevent the passage of flame, thereby establishing communication between the inside and the outside of the tube and means for stiffening and preventing displacement of the walls of the tube.

31. A safety device to prevent explosions, comprising a tubular body, made of metal in strip form wound spirally so as to afford overlapping walls, said metal being corrugated, the corrugations providing a plurality of restricted passages for liquid and to prevent the passage of flame between the walls, thereby establishing communication between the inside and outside of the tube at various points between the ends, the walls of the passages being bent and means for stiffening and preventing displacement of the walls o the tube.

In testimony whereof I affix my signatur in presence of two witnesses.

KARL LANGREHR.

Witnesses:
 LUISE KATHER,
 ROBERT J. RONNFREN.